United States Patent

Bland

[11] 4,046,297
[45] Sept. 6, 1977

[54] VEHICLE BUMPER MOUNTED CARRIER FOR CYCLES

[76] Inventors: Herbert Bland, 133 N. Arbor Trail, Apt. 603, Park Forest, Ill. 60466

[21] Appl. No.: 647,135

[22] Filed: Jan. 7, 1976

[51] Int. Cl.² .............................................. B60R 9/10
[52] U.S. Cl. .............................. 224/42.03 B; 214/450
[58] Field of Search .............. 214/450; 224/42.03 B, 224/42.03 R, 42.03 A, 42.04, 42.06, 42.07, 42.08, 42.21, 42.46 R, 29 R

[56] References Cited

U.S. PATENT DOCUMENTS

| | | | |
|---|---|---|---|
| 2,518,538 | 8/1950 | Giblin | 224/42.43 X |
| 2,950,034 | 8/1960 | Osborn | 224/42.03 A |
| 3,175,743 | 3/1965 | Richard | 224/42.46 R |
| 3,251,520 | 5/1966 | Van Dyke et al. | 224/42.03 B |
| 3,744,689 | 7/1973 | Kjensmo | 224/42.03 B |

Primary Examiner—Robert J. Spar
Assistant Examiner—Jerold M. Forsberg
Attorney, Agent, or Firm—Sabin C. Bronson

[57] ABSTRACT

A support, for a wheeled vehicle, for mounting preferably on the rear bumper of an automobile, which support is designed so that it may be mounted on the standard bumper of all domestic automobiles, and on the bumpers of practically all foreign made cars. It is provided with a ramp for loading and unloading the cycle thereon and means for holding it down and in upright position on the support while the automobile is moving.

2 Claims, 6 Drawing Figures

U.S. Patent  Sept. 6, 1977  Sheet 1 of 2  4,046,297
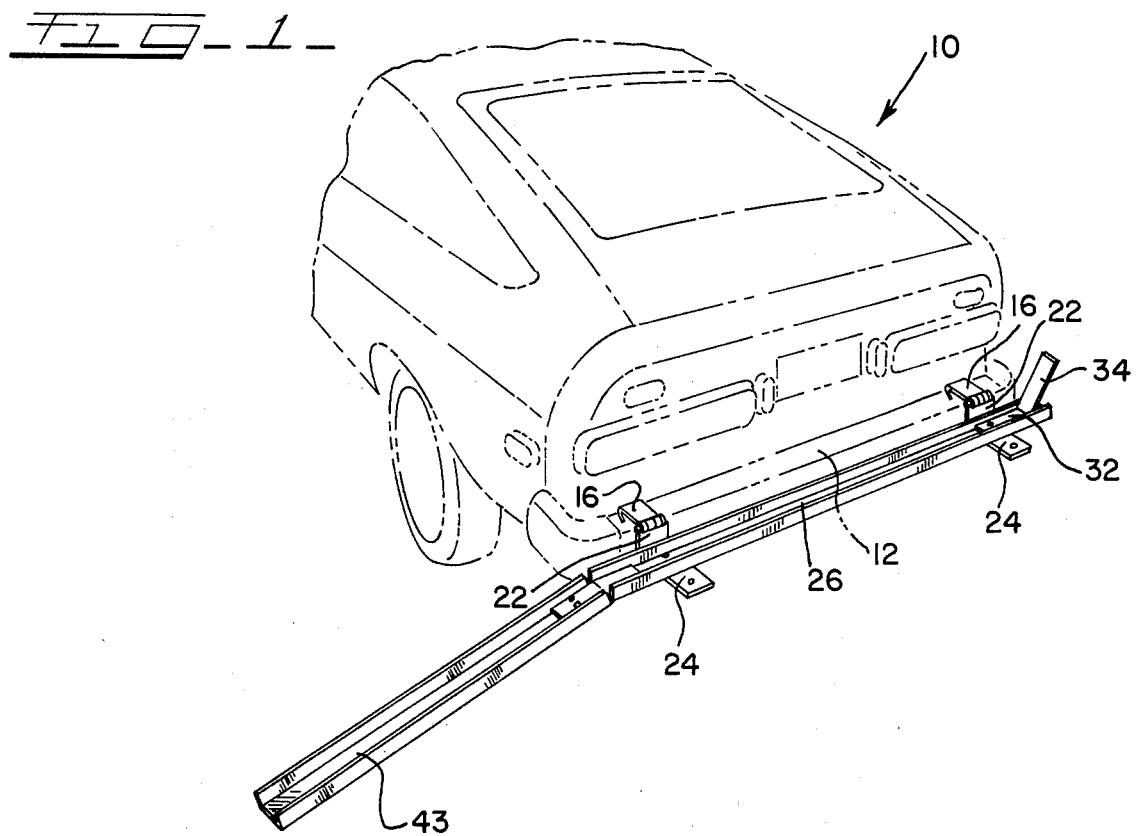
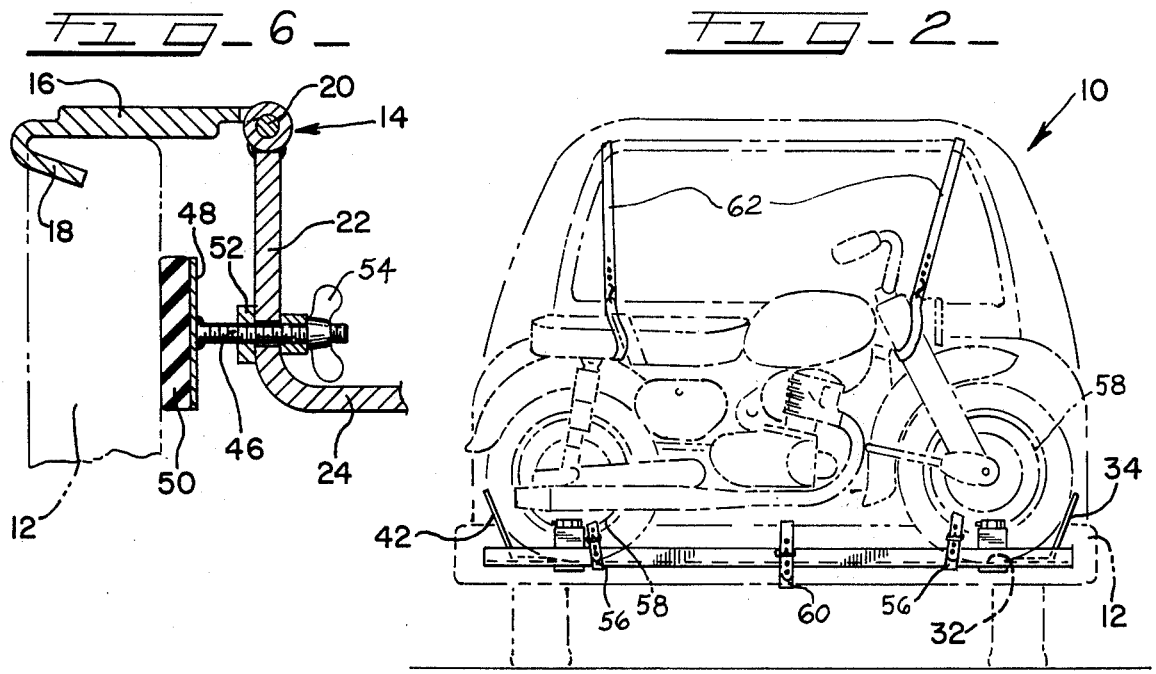

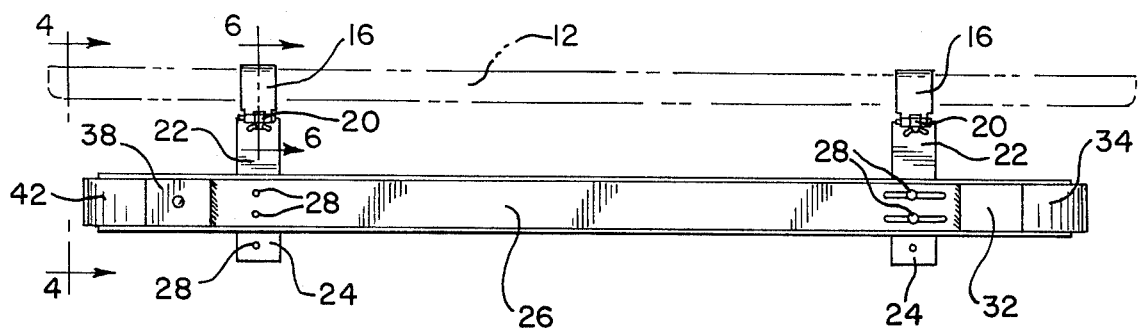
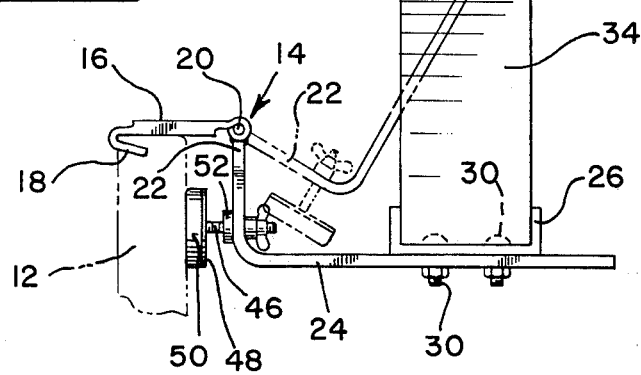
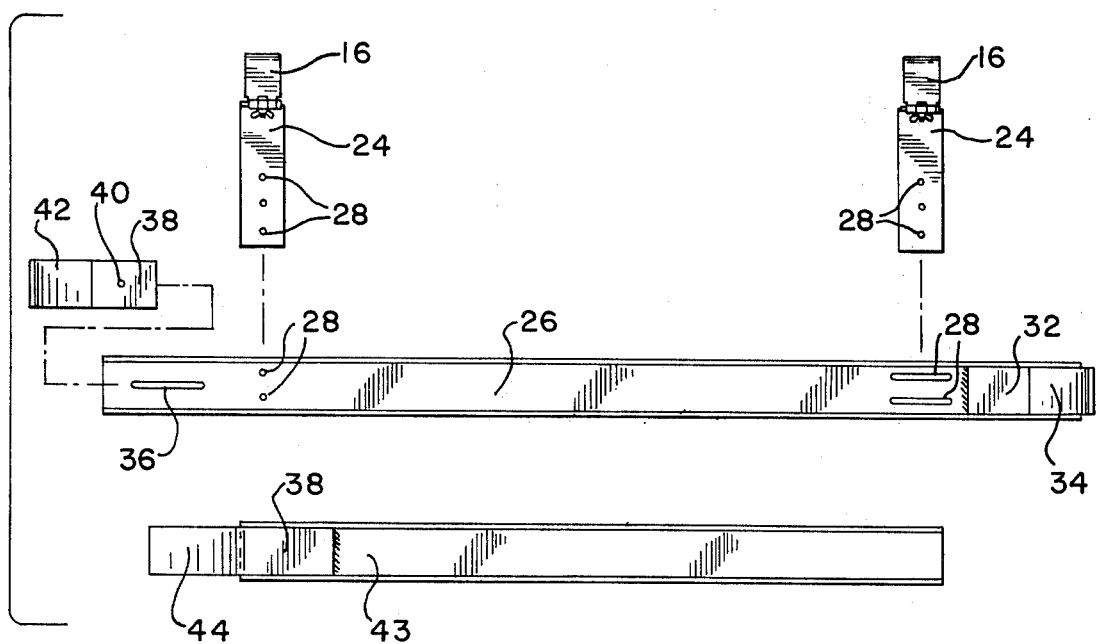

VEHICLE BUMPER MOUNTED CARRIER FOR CYCLES

BACKGROUND AND SUMMARY OF THE INVENTION

This invention relates to improvements in racks or carriers which are removably mounted on preferably the rear bumpers of automobiles for transporting two wheeled cycles from place to place where they can be used. The use of so called Dirt Cycles on improved highways is prohibited in many states because of the power of these cycles and the damage they may do to the highways traveled upon. But there is such a growing number of riders of these cycles that areas have been set aside where one may bring his cycle and there ride it to his utmost content. The sport has become so prominent that hundreds of enthusiastic riders congregate at such areas and compete with each other riding over hazard trails etc., laid out in said areas for such competition.

The problem for these buffs is to get their cycles to the areas where such competitions are held without damage to highways in getting the cycles there.

The prior art recognizes this problem and patents have been issued on such devices. For example, see U.S. Pat. No. 3,720,333 of Mar. 13, 1973, to Vaughn, which discloses a similar device utilizing a more permanently installed support, but which lacks features which we consider essential. While there are other types of cycle carrier racks in the prior art our invention is significantly distinguishable from those known to us and is believed patentable thereover.

BRIEF DESCRIPTION OF THE DRAWINGS

In the drawings accompanying this application and wherein like reference characters indicate like parts:

FIG. 1 is a perspective view of the rear of a passenger automobile with the cycle carrier of our invention illustrated mounted upon the rear bumper of the automobile.

FIG. 2 is an elevational view of the cycle supported on the carrier.

FIG. 3 is a top plan view of the carrier as it would appear mounted on the bumper of an automobile.

FIG. 4 is an end elevation of the carrier on the line 4—4 of FIG. 3, as it appears mounted on a bumper and illustrating its adjustability to support the carrier in horizontal position.

FIG. 5 is an exploded plan view of the parts showing our adjustable length features.

FIG. 6 is a cross section on the line 6—6 of FIG. 3, of one of our hangers for supporting the carrier.

DESCRIPTION OF THE PREFERRED EMBODIMENT

Referring now in particular to FIG. 1, the numeral 10 indicates the rear end of a conventional automobile, shown in dotted lines, and includes a rear transverse bumper 12. The cycle carrier includes a pair of similar bumper mounted hinge brackets 14, each including an upper plate 16 having a backwardly turned hook portion 18 at one end, adapted to hook over the upper usually inturned edge of a vehicle bumper 12, in horizontally spaced relation thereon. The upper plate 16 at the other end is hingedly connected as at 20 to a plate 22, the lower end of which terminates in a right angularly shaped flange 24 which extends outwardly sufficiently to form a support for the elongated upwardly facing channel carrier 26, the ends of which rest upon and overlap the two flanges 24 slightly. The web of the channel 26 and the flanges 24 are provided with registering openings 28. It will be noted that the openings in the web of one end of the channel 26 is longitudinally elongated to provide adjustability in attaching the channel to the flanges 24. Bolts 30 extend through the registering openings 28 to securely hold the channel 26 to the flanges 24.

At one end of the channel 26 is fixed one flange 32 of an oblique angle, the other flange 34 of which extends diagonally therefrom to form a stop for a wheel of the cycle when supported on the channel 26 as shown in FIG. 2.

At the other end of the channel is an elongated opening 36 on which is mounted an angle similar to the angle 32-34. This angle has a base flange 38 with a central opening 40 therein registerable with opening 36, and an upwardly inclined flange 42. A ramp channel 43 having a flange extension 44 reaching outwardly at a slight downturned angle so as to rest on the end of channel 26 as shown in FIG. 1 when loading a cycle up the ramp and onto the carrier 26 with the front wheel up against the bumper 34. After loading the cycle, the ramp is removed and the other bumper angle 38-42 is placed on the end of the ramp by a bolt passing through the opening 40 into and through elongated opening 36, then slid toward and against the rear wheel of the cycle, and then the bolt is tightened to hold the bumper angle firmly in place. Thus the cycle can not move forward or backward, being held by the bumper angles.

In order to maintain the flange 24 in a substantially horizontal position, the plate 22 of the brackets 14 are provided with a threaded opening therethrough. A bolt 46, having a disc 48 with a pad 50 thereon at one end is threaded through the opening in plate 22 of brackets 14 so that when the plate 16 of the brackets 14 are hooked over the upper edge of the automobile bumper 12 the plates 22 will depend therefrom until the pad 50 on bolt 48 engages the outer surface of the automobile bumper 12. By adjusting the bolts 40 in or out of the threaded opening in arms 22, the flange 24 may be brought into a horizontal position for loading the cycle on the carrier. A nut 52 on bolt 46 may then be run out to engage the plate 22, and the wing nut 54 then screwed home to act as a lock nut in holding the parts securely in place.

In order to fit and be applicable to all bumpers of automobiles, the length of plate 22 must be at least as long as the overall width of the widest bumper in use so that the hook 18 may engage the upper edge of a bumper, the arm 16 extend over the top thereof regardless of its contour, and the arm 22 depend downwardly along the outside of the bumper, with the pad 50 engaging the same, as shown in FIGS. 2 and 6 to hold the flanges 24, and thereby the carrier in horizontal position.

In order to maintain the carrier secure on the vehicle bumper, a strap 56 is provided for each wheel of the cycle carrier, said strap extending around the rim 58 of the wheel, between a pair of spokes thereof, and around the carrier. The strap 56 is tightened so that the wheels of the cycle cannot bounce up off the carrier during movement of the car.

To maintain the carrier in fixed position on the bumper a strap 60 surrounds the bumper and bracket after the cycle has been mounted thereon, so that the bracket will be held securely in place during movement of the car.

To maintain the cycle in upright fixed position on the bracket a pair of straps 62 are provided, each having a hook at one end adapted to hook onto the hinge posts of the trunk lid of the automobile and extend outwardly over the upper edge of said lid, down thereover and hold the front and rear frame members of the cycle to maintain it securely in place during movement of the vehicle.

It is believed the above description, taken in connection with the accompanying drawing, will enable one skilled in the art to make and use the invention.

We claim:

1. A cycle carrier, comprising a pair of hinge brackets, mounted in horizontally aligned and spaced relation along the upper marginal edge of a vehicle bumper, each bracket having hingedly connected upper and lower plates, the free end of each of the upper plates being turned into a hook adapted to engage the upper edge of a vehicle bumper and providing the sole attachment for the carrier to the bumper, the lower plate of each bracket being turned into an angularly disposed flange, means for adjusting the pivotal connection of said plates so that said angularly disposed flanges are in substantially the same horizontal plane, a channel member carried on said flanges for supporting a cycle thereon, said channel members being adjustably mounted longitudinally on said flanges, said pivotal adjusting means including a pad screw threadedly mounted in said depending plate, to prevent contact of said plate with said bumper.

2. The cycle carrier of claim 1, wherein an upwardly inclined flange is mounted at either end of said channel member to form stops for the wheels of a cycle carried thereon, one of said oblique angles, being adjustable longitudinally on said carrier.

* * * * *